Patented Apr. 19, 1932

1,854,354

UNITED STATES PATENT OFFICE

MAX WALLERSTEIN, OF NEW YORK, N. Y., ASSIGNOR TO WALLERSTEIN COMPANY, INC., OF NEW YORK, N. Y., A CORPORATION OF NEW YORK

PROCESS OF MAKING CHOCOLATE SIRUP

No Drawing.     Application filed December 27, 1928. Serial No. 328,853.

This invention relates to a method or process of producing a substantially stable, non-thickening chocolate sirup.

As pointed out in my copending application, Serial No. 265,222, the chocolate sirup of commerce as generally prepared gradually thickens, so that it is difficult to pour and frequently sets entirely so that it cannot be poured at all and is thus useless, this sirup being, on this account, objectionable to the trade.

Certain proposals have been made for producing an aqueous chocolate beverage which will have keeping qualities that enable the same to be stored or kept over extended periods of time, but in the preparation of such chocolate sirup, the valuable cocoa fats are eliminated, and such beverages are objectionable for this and other reasons.

The causes of the thickening or setting of the sirup are not fully understood, but I have discovered that this thickening or setting of the sirup, which usually occurs after the sirup has been kept for some time, can be substantially prevented by a hydrolysis of the cocoa, under proper conditions, and I have found that such hydrolysis is easily and quickly effected by the use of the enzymatic preparation known as "Rapidase".

This substance is a preparation or product containing an amylolytic enzyme which converts starch and is produced by growing or cultivating bacteria of the subtilis and mesentericus groups, and is, I have discovered, preferably in a purified state, a very satisfactory agent for carrying out the present process.

It is the object of the present invention to produce an improved process in which Rapidase is employed as the converting agent for the production of a chocolate sirup which will remain smooth and fluid, so that it will flow freely, which does not set to any substantial extent, thus permitting keeping in stock for considerable periods, and in which the valuable cocoa fats are retained.

As an example of my process, I may proceed as follows: 50 pounds of powdered cocoa are mixed with 145 pounds of water at a temperature of 150° F. The pH of the mixture is adjusted to approximately 7.0 to 7.5 by the addition of a suitable alkali, as soda-ash, which has been previously dissolved, this pH being that favorable to the action of the Rapidase. To this mixture 120 c. c. of Rapidase are added, and the mixture is preferably gradually brought to a temperature near the boiling point and kept at that temperature from one to two hours. The mixture is then cooled to a temperature at which the Rapidase best acts, that is, about 145° F. to 150° F., and an additional 500 c. c. to 1000 c. c. of Rapidase are added, the mixture being kept at the temperature of 145° F. to 150° F. for a time sufficient for the conversion of the starchy constituents of the cocoa powder. As a general rule, the hydrolysis has sufficiently proceded when the iodine test shows that the starch has been so converted that a test sample will not give any further blue reaction with iodine. The time necessary for this conversion depends on the amount of the Rapidase used, the larger the amount the shorter the time necessary, and, as a general rule, with the proportions stated above, six hours are sufficient to bring about the desired conversion.

The temperature is then raised to about 190° F and about 425 pounds of cane sugar is added and mixed in until dissolved. The mixture is then, by the addition of the necessary amount of water, brought to a suitable concentration, and the sirup can then be packaged and sterilized in any suitable manner.

If desired, about one-third of the cane sugar may be replaced with an invert sugar, thereby preventing crystallization of the sirup, which is desirable under some circumstances, particularly where a sirup of high concentration is to be produced.

With the process described, using Rapidase, the desired conversion of the starch content of the cocoa powder is easily and quickly effected, and a chocolate sirup is produced which is fluid and does not set to any substantial extent even after long periods of storage and in which the valuable and desirable cocoa fats are retained.

What I claim is:

1. The process of producing a fluid substantially non-thickening chocolate sirup from cocoa, which consists in subjecting a pasty or sirupy mixture of cocoa and water to the action of a relatively low proportion of an enzymatic preparation containing the amylolytic enzyme produced by bacteria of the type of bacillus mesentericus or subtilis until the conversion of the starch in the cocoa is substantially complete under such conditions of concentration that the cocoa fats are retained in an emulsified condition and the mixture maintained freely flowable, and then finishing into a chocolate sirup.

2. The process of producing a fluid substantially non-thickening chocolate sirup from cocoa, which consists in making a pasty or sirupy mixture of cocoa powder and water, adding to the mixture an enzymatic preparation containing the amylolytic enzyme produced by bacteria of the type of bacillus mesentericus or subtilis, cooling the mixture, adding to the mixture a larger amount of the enzymatic preparation, the total amount of the enzymatic preparation added being of a relatively low proportion, keeping the mixture at a suitable temperature for the action of the enzyme until the cocoa starch is substantially converted and at the same time the cocoa fats are retained in an emulsified condition and the mixture maintained freely flowable, and finishing into a sirup.

3. The process of producing a fluid substantially non-thickening chocolate sirup from cocoa, which consists in making a pasty or sirupy mixture of cocoa powder and water, adding to the mixture an enzymatic preparation containing the amylolytic enzyme produced by bacteria of the type of bacillus mesentericus or subtilis, cooling the mixture to 145° F. to 150° F., adding to the mixture a larger amount of the enzymatic preparation, the total amount of the enzymatic preparation added being of a relatively low proportion, keeping the mixture at a suitable temperature for the action of the enzyme until the cocoa starch is substantially converted and at the same time retaining the cocoa fats in an emulsified condition and the mixture maintained freely flowable, adding a required amount of sugar, and finishing into a sirup.

4. The process of producing a fluid substantially non-thickening chocolate sirup from cocoa, which consists in making a pasty or sirupy mixture of cocoa powder and water, adding to the mixture an enzymatic preparation containing the amylolytic enzyme produced by bacteria of the type of bacillus mesentericus or subtilis, heating the mixture to near the boiling point, cooling the mixture, adding to the mixture a larger amount of the enzymatic preparation, the total amount of the preparation added being of a relatively low proportion, keeping the mixture at a suitable temperature for the action of the enzyme until the cocoa starch is substantially converted and at the same time retaining the cocoa fats in an emulsified condition and the mixture maintained freely flowable, and finishing into a sirup.

5. The process of producing a fluid substantially non-thickening chocolate sirup from cocoa, which consists in making a pasty or sirup mixture of cocoa powder and water, adding to the mixture an enzymatic preparation containing the amylolytic enzyme produced by bacteria of the type of bacillus mesentericus or subtilis, adjusting the pH of the mixture to approximately 7.0 to 7.5, cooling the mixture to 145° F. to 150° F., adding to the mixture a larger amount of the enzymatic preparation, the total amount of the preparation added being of a relatively low proportion, keeping the mixture at a suitable temperature for the action of the enzyme until the cocoa starch is substantially converted, at the same time retaining the cocoa fats in an emulsified condition and the mixture maintained freely flowable, adding a required amount of sugar, and finishing into a sirup.

In testimony whereof, I have hereunto set my hand.

MAX WALLERSTEIN.